United States Patent [19]
Hall et al.

[11] Patent Number: 5,657,444
[45] Date of Patent: Aug. 12, 1997

[54] MICROPROCESSOR WITH SECURE PROGRAMMABLE READ ONLY MEMORY CIRCUIT

[75] Inventors: Christopher M. Hall, Redwood City; William E. Miller, Los Gatos, both of Calif.

[73] Assignee: National Semiconductor Corporation, Santa Clara, Calif.

[21] Appl. No.: 510,831

[22] Filed: Aug. 3, 1995

[51] Int. Cl.$^6$ .................................................. H04L 12/22
[52] U.S. Cl. .................................................. 395/186
[58] Field of Search .............................. 395/186, 185.04, 395/430; 365/96, 189.07, 218; 364/965.76, 246.6

[56] References Cited

U.S. PATENT DOCUMENTS

| | | | |
|---|---|---|---|
| 3,264,615 | 8/1966 | Case et al. | 340/172.5 |
| 3,573,855 | 4/1971 | Cragon et al. | 340/172.5 |
| 3,742,458 | 6/1973 | Inoue et al. | 340/172.5 |
| 4,153,933 | 5/1979 | Blume, Jr. et al. | 364/200 |
| 4,268,911 | 5/1981 | Bell | 365/104 |
| 4,519,036 | 5/1985 | Green | 364/200 |
| 4,583,196 | 4/1986 | Koo | 364/900 |
| 4,786,790 | 11/1988 | Kruse et al. | 235/380 |
| 4,858,185 | 8/1989 | Kowshik et al. | 365/181 |
| 4,873,671 | 10/1989 | Kowshik et al. | 365/189.12 |
| 4,935,962 | 6/1990 | Austin | 380/25 |
| 4,951,247 | 8/1990 | Kruse et al. | 364/900 |
| 4,975,878 | 12/1990 | Boddu et al. | 365/189.07 |
| 5,175,840 | 12/1992 | Sawase et al. | 395/425 |
| 5,287,519 | 2/1994 | Dayan et al. | 395/700 |
| 5,341,422 | 8/1994 | Blackledge, Jr. et al. | 380/4 |
| 5,345,413 | 9/1994 | Fisher et al. | 365/96 |
| 5,363,334 | 11/1994 | Alexander et al. | 365/218 |
| 5,432,939 | 7/1995 | Blackledge, Jr. et al. | 395/700 |
| 5,465,341 | 11/1995 | Doi et al. | 395/183.06 |
| 5,555,373 | 9/1996 | Dayan et al. | 395/188.01 |
| 5,557,743 | 9/1996 | Pombo et al. | 395/186 |
| 5,574,786 | 11/1996 | Dayan et al. | 380/4 |

OTHER PUBLICATIONS

"Single–Chip EPRO/OTP Microcontrollers" Nat. Semiconductor Data Book National Semiconductor, Sep. 1994 pp. 423–439.

"EPROM–Based 8 Bit CMOS Microcontroller" PLC16C54A, Microchip Data Book, (1993) pp. 105–144.

Primary Examiner—Robert W. Beausoliel, Jr.
Assistant Examiner—Stephen C. Elmore
Attorney, Agent, or Firm—Eugene Conser

[57] ABSTRACT

A microprocessor which has a secure read only memory is disclosed. The secure read only memory provides for storage of a program and security to protect that program.

4 Claims, 3 Drawing Sheets ns 5,657,444

MICROPROCESSOR WITH SECURE PROGRAMMABLE READ ONLY MEMORY CIRCUIT

TECHNICAL FIELD OF INVENTION

This invention relates to integrated circuits of the type known as microprocessors and more particularly to microprocessors containing as a part thereof a programmable read only memory (PROM) suitable for storage of a program controlling the operation of the microprocessor and systems for preventing unauthorized copying or reading of software stored in the PROM.

DESCRIPTION OF RELATED ART

Microprocessors are now well-known in the semiconductor industry. A typical microprocessing system is described in U.S. Pat. No. 4,153,933. The microprocessor shown and described in that patent includes a central processing unit (CPU), random-access memory (RAM) and a programmable read-only memory (PROM). A program counter in the CPU is used to fetch instructions stored in the PROM. The PROM may also be externally addressed for testing and programming. The particular program contained in the PROM is usually proprietary to the party supplying a "programmed" microprocessor. However, because of the need for testing and programming, the PROM contents are available to the user or any other third party.

Typically a supplier of a microprocessor with a "programmed" PROM is concerned that the ultimate users of the microprocessor will not have access to the code of a proprietary program placed in the PROM by the supplier. By allowing the ultimate user to have access to this code, the ultimate user can program his own microprocessor, thus eliminating the supplier or accidentally damaging the code, thus rendering it useless.

Various schemes to prevent unauthorized copying or reading of the PROM have been proposed. One approach is to encrypt memory address and data signals transmitted. One disadvantage of this approach is that a person with a knowledge of encryption circuitry can defeat the encryption scheme and copy the proprietary program. A second disadvantage of this approach is that the CPU must encrypt and decrypt data thus putting a heavy overhead burden on the CPU. A third disadvantage of this approach is the cost of the additional logic required for encryption.

A second approach is to provide a conductive fusible link between the PROM and the outside world. A system providing such an approach is described in U.S. Pat. No. 4,268,911. This system requires fusible links on PROM test leads going off-chip. These fusible links are electrically opened using sufficient current to melt the metal comprising the links. A disadvantage of this approach is that over time, these fused links may electrically grow back together and provide access to the PROM. A second disadvantage of this approach is that the electrical current required to fuse the links is large and subsequently the transistors required to supply this current require a large amount of die area.

A third approach is to provide a programmable read only configuration register. The register would have a security bit to determine whether security is enabled or disabled. A disadvantage of this approach, is that the support logic for this approach would require a large number of additional transistors for reading, writing and decoding.

Accordingly, it would be desirable to have a security scheme that would keep the amount of additional circuitry required or the amount of CPU overhead to support this function to a minimum.

SUMMARY OF THE INVENTION

This invention overcomes the above problems and provides a convenient and economical method of both allowing the proprietary program to be placed in the PROM to be verified and authenticated and of preventing third parties from having access to the program.

Briefly described, the invention provides for a microprocessor circuit, in a single package, which includes a bi-directional data bus with terminals for connecting to an external circuit, a bi-directional address bus with terminals for connecting to another external circuit, a random-access memory (RAM), a central processing unit (CPU), a secure programmable read only memory (SPROM) and input detection circuits. The RAM, CPU and SPROM are connected to the bi-directional address and data busses and to each other. The CPU performs arithmetic functions and controls operation of the microprocessor circuit, and includes a program counter apparatus, coupled to the SPROM and the address bus, for providing address signals to the SPROM. The SPROM provides for storage of a program and security to protect that program. The input detection circuits receive externally applied signals, for testing the microprocessor, and control signals to control the program counter apparatus and the SPROM. The control signals cause coupling of instructions, from an external programming apparatus, to the input detection circuits and coupling of data to the data bus terminal for storing of a program in the SPROM.

DETAILED DESCRIPTION

Figure 1:
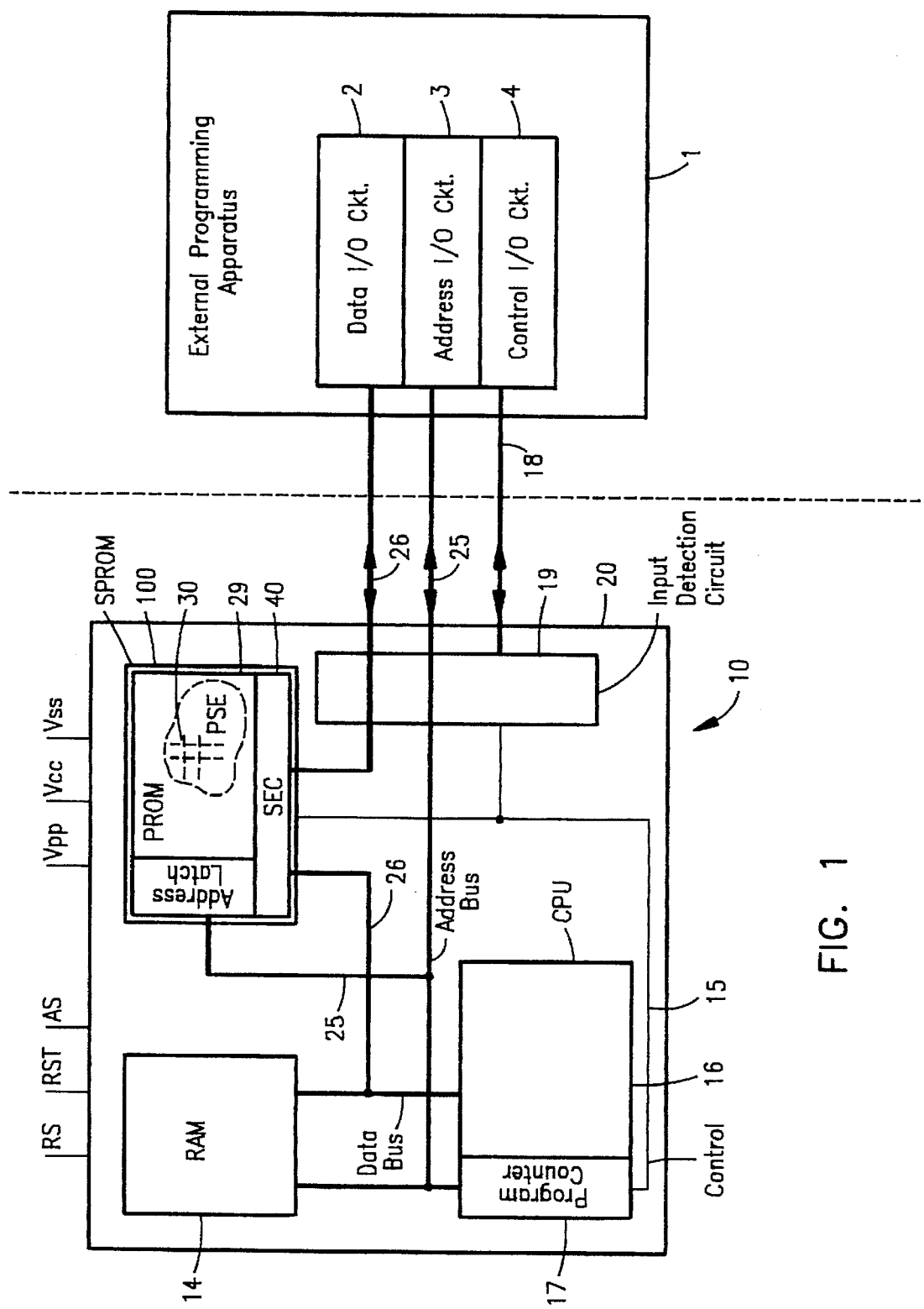
FIG. 1 is a block diagram of a microprocessor in accordance with one embodiment of the present invention.

Referring to FIG. 1, a microprocessor 10 in accordance with one embodiment of the present invention is encapsulated in a single package 20 and includes a central processing unit (CPU) 16, a random-access memory (RAM) 14, an input detection circuit (IDC) 19, and a secure programmable read only memory (SPROM) 100 for storing computer instructions and interconnected by a main, bi-directional data bus 26, and a main, bi-directional address bus 25 (As discussed in more detail below, the SPROM 100 includes programmable security elements (PSE) 30 and a security evaluation circuit 40.). The data 26 and address 25 busses, in addition to communicating with the CPU 16, RAM 14 and SPROM 100, communicate with external circuits through multiple input/output ports. The CPU 16 includes a program counter 17 for incrementing through the SPROM 100 addresses to sequentially fetch the instructions, stored in the SPROM 100, required to execute a program.

In FIG. 1 some of the input and output lines of the microprocessor are illustrated such as the ground line Vss. The microprocessor utilizes, during normal (non-programming) operation, a single (positive) power source which is identified as Vcc. While the microprocessor is operating, the power source applied to Vcc is also applied to the line identified as Vpp. However, during the programming of the SPROM 100, a power source (positive) substantially higher in potential than the power source applied to the Vcc line, is applied to the Vpp line.

The programming or write cycle operates as follows. The SPROM 100 is programmed by an external programming apparatus which supplies addresses and data to the SPROM 100 as well as the control signals, write and address strobe. After application of Vpp, Vcc and Vss to the appropriate terminals of the microprocessor, the external programming apparatus then supplies the data to be written and the address to which it is to be written in the SPROM 100, followed by an address strobe signal to latch the address into the SPROM 100. After the address has been latched into the SPROM 100, the external programming apparatus then supplies a write command to write the data into the SPROM 100. After the write cycle is complete, the write command is removed and the address supplied by the external programming apparatus is incremented to the next address to be programmed, where the write cycle is repeated until all addresses in the SPROM 100 are programmed.

Similarly, a read cycle operates as follows. The SPROM 100 can be read using an external programming apparatus. During reading, the external programming apparatus supplies addresses to the SPROM 100 as well as the control signals, read and address strobe. After application of Vcc and Vss to the appropriate terminals of the microprocessor, the external programming apparatus then supplies the address which is to be read in the SPROM 100, followed by an address strobe signal to latch the address into the SPROM 100. After the address has been latched into the SPROM 100, the external programming apparatus then supplies a read command to the SPROM 100 which places the contents of the SPROM 100 onto the data bus. After the read cycle is complete, the read command is removed and the address supplied by the external programming apparatus is incremented to the next address to be read, where the read cycle is repeated until all addresses in the SPROM 100 have been read.

Often, a read cycle is performed immediately after a write cycle to verify that the data has been correctly written into the SPROM 100.

During programming of the SPROM 100, one or more of the addresses are left unprogrammed and are designated as the programmable security elements (PSE) 30. After the SPROM 100 has been programmed and verified, the unprogrammed (unlocked) PSE's 30 are programmed (locked) providing a code to the security evaluation circuit.

Figure 2:
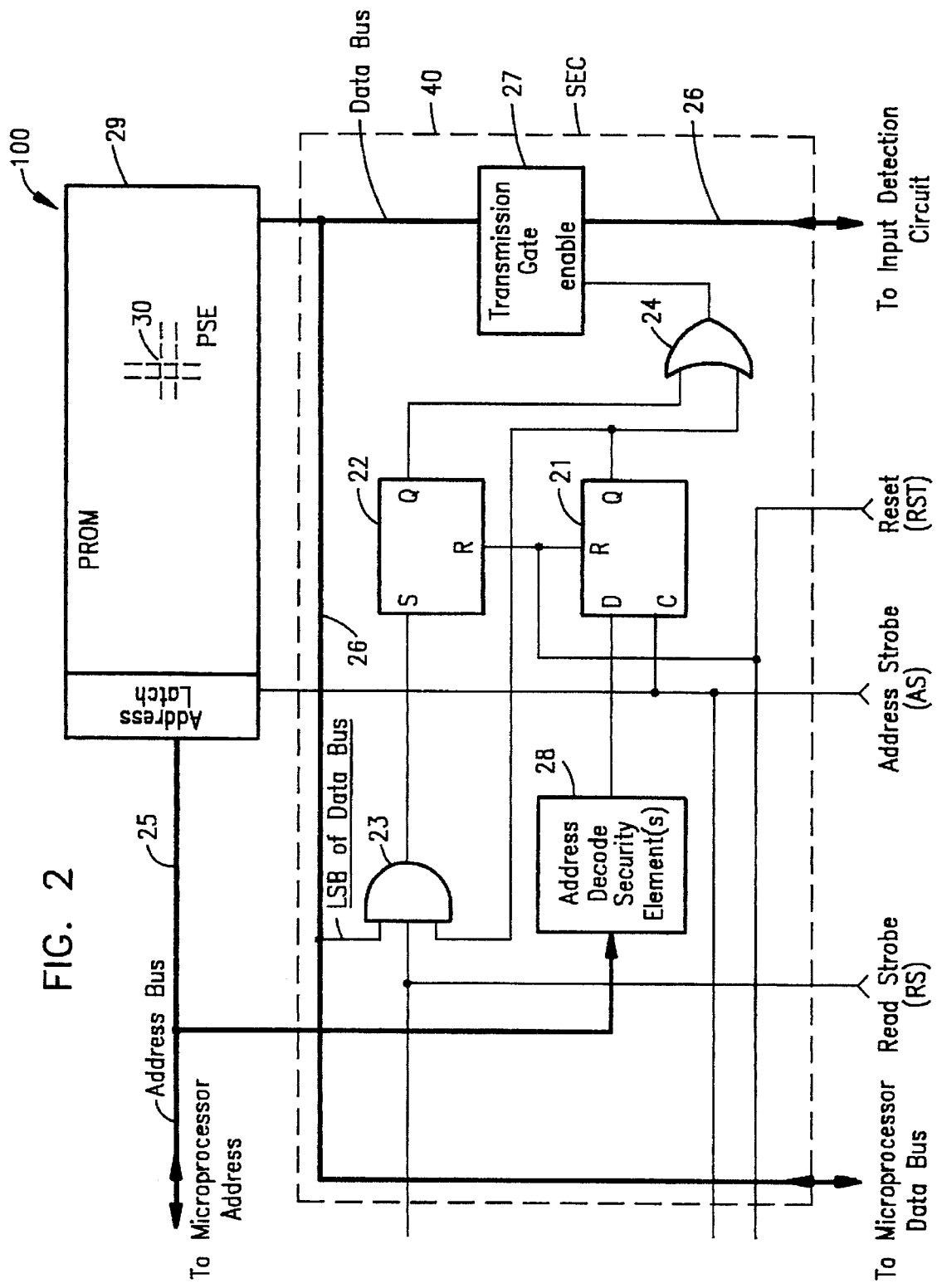
FIG. 2 is a logic diagram of an SPROM in accordance with one embodiment of the present invention.

Referring to FIG. 2, a security evaluation circuit 40 in accordance with one embodiment of the present invention controls external access to the program in the PROM 29 dependent on the status of the PSE 30. An address decode circuit 28 is coupled to the address bus 25, wherein the address decode circuit 28 gives an output when the PSE 30 is addressed. Similarly, a transmission gate 27 is interposed between the in-package data bus 26 and the external package 20 pins, wherein the transmission of data to the outside world is controlled by an OR gate 24. The OR gate 24 has 2 inputs, one coming from the output of a Set/Reset Flip-Flop (S/R) 22 and the other coming from the output of a D type Flip-Flop 21. The S/R Flip-Flop 22 is controlled by the microprocessor global reset (RST) going to its reset input and the output of a three input AND gate 23 going to its set input. The D type Flip-Flop 21 is controlled by the microprocessor global reset (RST) going to its reset input, the microprocessor address strobe (AS) going to its clock input and the output of the address decode circuit 28 going to its data input. Finally the AND gate 23 is driven by the least significant bit(this can be any bit or combination of bits defined for security) of the Data Bus 26, the output of the D type flip-Flop 21 and the microprocessor read signal (RS).

Figure 3:
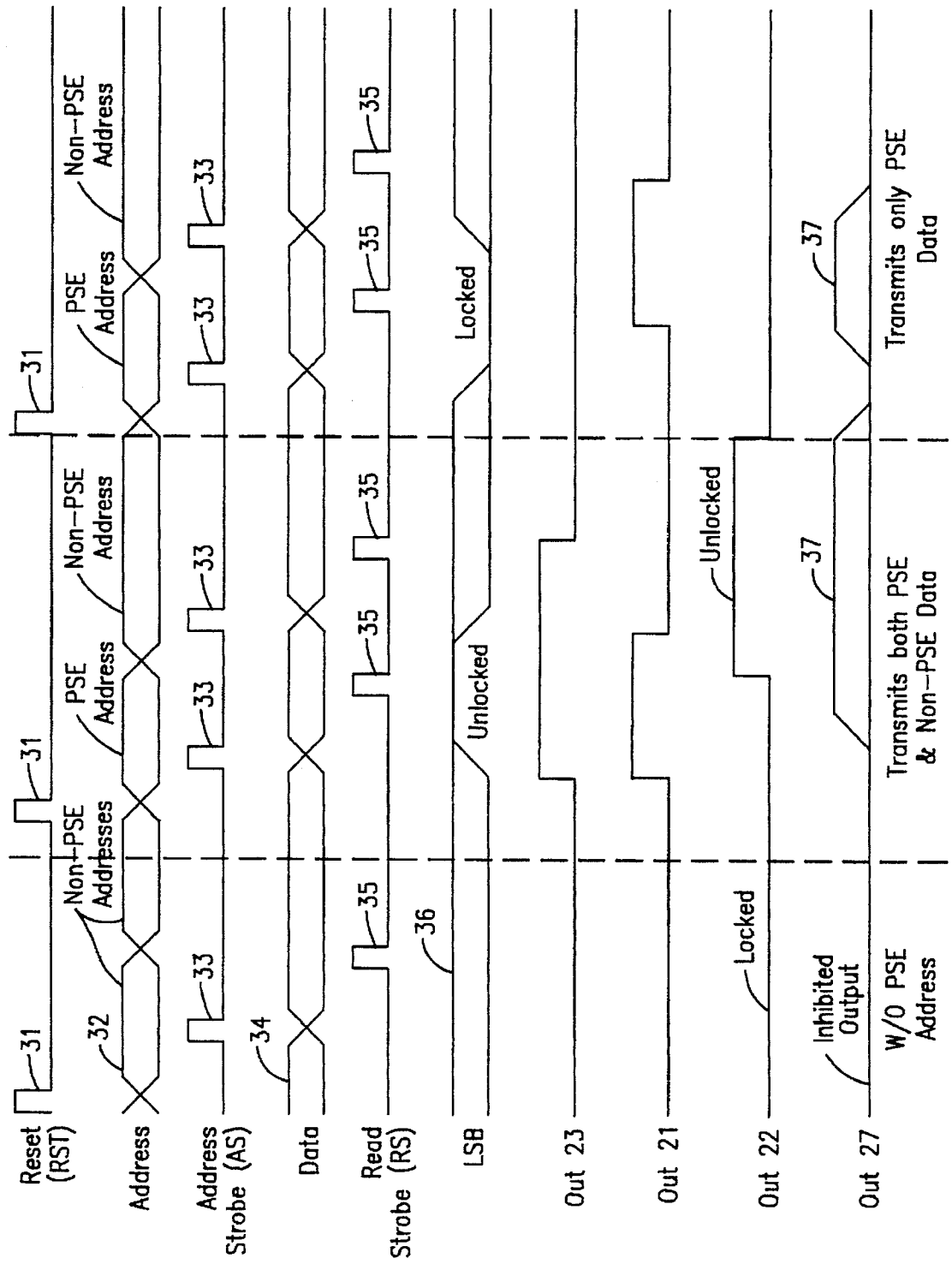
FIG. 3 is a timing diagram for the SPROM of FIG. 2.

In practice (referring to FIGS. 2 and 3) the security evaluation circuit 40 responds to a reset signal 31 by resetting the D type 21 and the S/R 22 Flip-Flops which, in turn, inhibits the transmission gate 27, thus preventing the transmission of data bus 26 information outside of the package 20. When the reset signal 31 is de-asserted, a PROM 29 address 32 is applied to the address bus 25 and subsequently an address strobe 33 is applied to the address strobe line, latching the address 32 into the PROM 29. If the address 32 is for any location other than the PSE 30 address, the transmission gate 27 will remain inhibited and not allow data to be transmitted outside of the package 20. If the address is for the PSE 30 address, the address decode circuit 28 will provide an output which will be clocked into the D type Flip-Flop 21 by the address strobe 33 which, in turn, will enable the transmission gate 27, thus transmitting the PSE 30 data, now on the data bus 26, outside the package 20. A read signal (RS) 35, in addition to the output of the D type Flip-Flop 21, is then applied to the AND gate 23, enabling it to transmit the state of the least significant bit (LSB) 36 of the data of the PSE 30. If the LSB 36 of the PSE 30 is "unlocked," the AND gate 23 output will set the R/S Flip-Hop 22 which, in turn, will enable the transmission gate 27 until another RST signal 31 is applied. In this manner, data from the PROM 29 may be read out from the data bus 26 through the enabled transmission gate 27 only when security is "unlocked." If the LSB 36 of the PSE 30 is "locked," then the AND gate 23 output will not set the R/S Flip-Flop 22. When the address on the address bus 25 is changed to an address other than the PSE 30 address, the transmission gate 27 will become inhibited. The transmission gate 27 will always be enabled when the address of the PSE 30 is on the address bus 25 and strobed into the PROM 29, thus enabling the external programming apparatus to determine the state of the PSE 30. When the PSE 30 is "locked," data from the PROM 29 cannot be read out from the data bus 26 through the disabled transmission gate 27.

The microprocessor 10 as described above, is entirely included in a single package 20 and can consist of a single integrated chip or multiple chips interconnected together in the single package 20. Economics, performance, technology, or any combination of the above, usually determines whether the microprocessor 10 is a single chip or multiple chips.

Various other modifications and alterations in the structure and method of operation of this invention will be apparent to those skilled in the art without departing from the scope and spirit of the invention. Although the invention has been described in connection with a specific preferred embodiment, it should be understood that the invention as claimed should not be unduly limited to such specific embodiment. It is intended that the following claims define the scope of the present invention and that structures and methods within the scope of these claims and their equivalents be covered thereby.

What is claimed is:

1. A microprocessor circuit comprising, in a single package:

a bi-directional data bus having terminals for coupling to a first external circuit;

a bi-directional address bus having terminals for coupling to a second external circuit;

a random-access memory (RAM) coupled to said bi-directional data and address busses;

a central processing unit (CPU) coupled to said bi-directional data and address busses and said RAM, for performing arithmetic functions and for controlling operation of said microprocessor circuit;

a secure programmable read only memory (SPROM) coupled to said bi-directional data and address busses and said CPU, for storing and protecting information, wherein said SPROM further includes:

a programmable read only memory array (PROM) containing a programmable security element (PSE), said PSE containing at least one security byte, said PSE having an address and locked and unlocked states;

a security evaluation circuit, coupled to said PSE, said PROM and said data bus, for determining the status of said PSE and providing read/write access to said PROM when said PSE is unlocked and preventing read/write access to said PROM when said PSE is locked;

said CPU including a program counter means, coupled to said SPROM and said address bus for providing address signals to said SPROM; and input detection means for receiving first and second externally applied predetermined signals for testing said microprocessor and for providing control signals to said program counter means and said SPROM, said control signals for causing coupling of instructions from an external programming means to said input detection means and data to said data bus terminal for causing a predetermined program to be stored in said SPROM.

2. The microprocessor circuit of claim 1, wherein said PSE comprises a least significant byte of said PROM.

3. The microprocessor circuit of claim 1, wherein said PSE comprises a most significant byte of said PROM.

4. The microprocessor circuit of claim 1, wherein said microprocessor circuit responds to an externally applied address strobe signal (AS), read signal (RS) and reset signal (RST):

and further wherein said security evaluation circuit comprises:

an address decoder circuit coupled to said address bus, wherein said address decoder circuit provides a decoder signal in response to said address of said PSE;

a transmission gate interposed between said data bus and said data bus terminals, said first gate having at least one input and corresponding output and an enable;

an AND gate having first, second and third inputs and an output, said first input connected to a least significant bit of said data bus, said third input coupled to said externally applied read signal;

an OR gate having first and second inputs and an output, said OR gate output connected to said transmission gate inhibit;

a set/reset (S/R) flip-flop having set and reset inputs and an output, said (S/R) flip-flop set input connected to said AND gate output, said (S/R) flip-flop reset input coupled to said externally applied reset signal, said (S/R) flip-flop output connected to first input of said OR gate; and a D type flip-flop having data, clock and reset inputs and an output, said D type flip-flop reset input coupled to said externally applied reset signal, said D type flip-flop clock input coupled to said externally applied address strobe signal, said D type flip-flop data input coupled to said address decoder, decoder signal and said D type flip-flop output connected to said OR gate second input and said AND gate second input;

wherein, said PSE having said unlocked state will allow transmission of data on said data bus outside said package and said PSE having said locked state will inhibit transmission of said data on said data bus outside said package.

* * * * *